(12) United States Patent
Janson et al.

(10) Patent No.: US 8,443,828 B2
(45) Date of Patent: May 21, 2013

(54) SIPHON WEIR VALVE FOR HIGH FLOW MUNICIPAL WATER TREATMENT SYSTEMS

(75) Inventors: Arnold Frederic Janson, Burlington (CA); Robert Joseph Kluszka, Hamilton (CA); David Blair Bingham, Hamilton (CA); Denis Joel Marie Guibert, Burlington (CA); Darren James Preete, Ontario (CA)

(73) Assignee: Zenon Technology Partnership, Wilmington, DE (US)

( * ) Notice: Subject to any disclaimer, the term of this patent is extended or adjusted under 35 U.S.C. 154(b) by 378 days.

(21) Appl. No.: 12/837,010

(22) Filed: Jul. 15, 2010

(65) Prior Publication Data

US 2012/0012189 A1 Jan. 19, 2012

(51) Int. Cl.
*F04F 10/00* (2006.01)

(52) U.S. Cl.
USPC .......................................... 137/143; 137/142

(58) Field of Classification Search
USPC .................................... 137/142, 143, 14, 486
See application file for complete search history.

(56) References Cited

U.S. PATENT DOCUMENTS

| 648,325 | A | * | 4/1900 | Adams | 137/139 |
|---|---|---|---|---|---|
| 1,383,167 | A | * | 6/1921 | Stenberg | 236/99 R |
| 3,079,939 | A | * | 3/1963 | Lapray | 137/128 |
| 3,782,453 | A | * | 1/1974 | Cates et al. | 165/138 |
| 3,997,444 | A | * | 12/1976 | McGivern | 210/242.1 |
| 4,035,299 | A |   | 7/1977 | Vroeginday |   |
| 4,810,130 | A | * | 3/1989 | Brombach et al. | 405/80 |
| 4,887,667 | A | * | 12/1989 | Kuhara | 165/96 |
| 5,009,261 | A | * | 4/1991 | Kuhara | 165/96 |
| 5,301,375 | A | * | 4/1994 | Osmond | 4/368 |
| 6,056,886 | A | * | 5/2000 | Hickok et al. | 210/776 |
| 6,669,840 | B2 | * | 12/2003 | Burrow | 210/104 |
| 7,520,695 | B2 | * | 4/2009 | Belford | 405/39 |

FOREIGN PATENT DOCUMENTS

EP 2055186 A1 5/2009

\* cited by examiner

*Primary Examiner* — John Rivell
*Assistant Examiner* — Umashankar Venkatesan
(74) *Attorney, Agent, or Firm* — Scott Pundsack; Borden Ladner Gervais LLP

(57) ABSTRACT

A device allows a liquid to flow between two open structures with different liquid surface elevations separated by a wall. The device has a conduit with an inlet on one side of the wall and an outlet on the other side of the wall separated by a high point above the expected liquid surface elevation. The conduit also has two valved openings, one connected to a source of suction that can evacuate air from the conduit and the other connected to a vent. In one example, the conduit is formed between a pair of spaced transverse walls attached to an arched cover. The transverse walls each have a slot allowing the device to be placed on top of a dividing wall between two tanks with surfaces of the dividing wall defining part of the conduit. In an example with multiple conduits, one or more interior walls are provided between a pair of end walls and a cover over the interior and end walls may be provided in segments. To initiate flow, a conduit is evacuated of sufficient air to allow a siphon to develop. To stop the flow, sufficient air is allowed to enter the conduit through the vent valve to break the siphon. To control the rate of flow in a device with multiple conduits, flow can be permitted in just some of the conduits. Flowrate through a conduit can also be varied by controlling the volume of air at the top of a conduit.

15 Claims, 10 Drawing Sheets

SIPHON WEIR VALVE FOR HIGH FLOW MUNICIPAL WATER TREATMENT SYSTEMS

FIELD

This specification relates to flow control devices and to water treatment systems.

BACKGROUND

The following background discussion is not an admission that anything discussed below is citable as prior art or common general knowledge.

In water (including wastewater) treatment systems, a flow of water may need to be provided and controlled past a wall separating two or more open structures containing water. For example, flow may be required between primary and secondary treatment tanks in a water treatment plant or between biological process and separation tanks in a wastewater treatment plant. In a membrane bioreactor (MBR), a flow may be required from a feed channel to a membrane tank or from a membrane tank to a return channel, or both. The word "tank" will be used in this specification for brevity to refer to open structures containing water generally, including tanks and channels as described above and related structures.

In large-scale plants, for example municipal water supply or wastewater treatment plants, the flow rate of water past a dividing wall between adjacent tanks can be very large. To provide and control flow past a dividing wall, fully or partially submerged valves are typically used. For example, knife-gate or sluice-gate valves may be used. The valves add to the cost of a plant, require periodic maintenance and sometimes leak. The valves also create various other significant costs and operational disadvantages that may be less apparent.

For example, the cost of a dividing wall increases if a valve will be placed in it. A dividing wall is often made of concrete on site and needs additional formwork to provide an opening that can be fitted with a valve. The force of water exerted on the valve includes dynamic forces and is concentrated on the wall around the opening. Extra reinforcement is required in the wall to provide the required wall strength, accounting for weakening created by the opening and a need to avoid deflections of the wall beyond the sealing limits of the valve. In a large plant, the opening in a concrete wall required for a conventional valve may be as large as about 7'×7' and the valve may need to stop water flowing at a velocity of about 1.5 ft/s. The total force on the valve can exceed 16,000 lbs, and this load has to be transferred to the walls around the opening, and the wall must be reinforced to withstand this load. The valve itself also requires structural reinforcing to keep deflections within allowable limits.

Conventional submerged valves through a dividing wall also require a way to service the valve. For example, servicing may require a shutdown and draining of both tanks. This in turn requires a way to operate the plant with the affected tanks temporarily drained. Alternatively, a secondary means for isolating the flow has to be provided. The secondary isolation means may be a second valve or "stop logs" installed on one side of a wall to block the flow of water so that a tank on the other side of the wall can be drained.

In some plants, particularly drinking water plants, a means may also be required to prevent cross-contamination between adjacent tanks through leaks within the design tolerance of the valve. This is particularly of concern when cleaning or disinfecting solutions are present in one tank and it is unacceptable to have the chemicals diffuse into the other tank. In these cases, a "block & bleed valve arrangement" is provided. This involves providing two valves so that a space between the valves can be vented and drained.

In some plants, baffling is also required to reduce the impact of water flowing through the valve on equipment in the downstream tank. For example, in a membrane bioreactor the membrane tanks contain membrane cassettes that can be damaged by strong horizontal flows. With conventional submerged valves, a vertical baffle is required so the incoming water does not hit with full force on the first downstream membrane cassette in the tank.

Siphon valves have been used as an alternative to submerged valves in membrane systems for drinking water and MBRs used for wastewater treatment. The siphon valve uses a closed conduit forming a path generally in the shape of an inverted "U" to transfer liquid over a dividing wall between two tanks. Flow is started by sucking liquid into the conduit and stopped by venting the conduit. However, these siphon valves do not provide rate of flow control and they have not been made with flow capacities adequate for very large plants. Although siphon valves inherently provide some advantages over submerged valves, such as preventing cross-contamination, submerged valves are still the dominant form of flow control device in water treatment systems.

INTRODUCTION

The following introduction is intended to introduce the reader to the detailed description to follow, and not to limit or define any claim.

A device for providing and controlling a liquid flow between two open structures with different liquid surface elevations separated by a wall will be described in detail further below. The structure of the device defines one or more conduits, each conduit having an opening on each side of the wall below the expected liquid surface elevation. Each conduit has a high point between its two openings located above the wall, or at least above the expected liquid surface elevation. For example, a conduit may have a generally inverted "U" shape. Each conduit communicates with two valved openings, one connected to a source of suction that can evacuate air from the conduit and the other connected to a vent, or to atmosphere, that can permit air to enter the conduit. The device may be called a "siphon weir valve" or "SWV" in the description herein.

In one example of a device, a conduit is formed between a pair of spaced transverse planar walls attached to an arched cover. The transverse walls each have a slot allowing the device to be placed on top of a dividing wall between two tanks. Optionally, the edges of the slots may be sealed to the adjacent surfaces of the dividing wall and the dividing wall used to define part of the conduits. When installed, the device thus provides a horseshoe or inverted "U" shaped conduit with openings extending downwards from a point between the openings into the liquid on either side of the dividing wall.

In a device with multiple conduits, one or more interior walls are provided between a pair of end walls. Each interior wall defines a side of two conduits. A cover over the interior and end walls may be provided in segments, each segment spanning between two walls, to allow for SWVs of varying length and flow capacity to be made from common components.

In its simplest form of operation, an SWV provides "on/off" flow control for water flowing between two tanks separated by a dividing wall. Liquid flow is by way of a siphon through one or more conduits. To initiate flow, a conduit is evacuated of sufficient air to allow a siphon to develop because the water level on one side of the dividing wall is higher than the other. To stop the flow, sufficient air is allowed to enter the conduit through the vent valve to break the siphon.

To provide rate of flow control in an SWV with multiple conduits, siphon flow can be permitted in some, but not all, of the conduits. Thus, flow capacities in fractions (with the number of conduits as the denominator) of the total flow capacity of the device can be provided. Optionally, one or more of the conduits may be made at a different size to increase the number of flow capacity options available. The number and size of the conduits supporting a siphon flow can be chosen to approximate or exceed a desired flow rate.

Flowrate through an SWV can also be varied by controlling the volume of air at the top of a conduit. For example, an amount of air can be provided in a conduit that is insufficient to break the siphon, but sufficient to displace some of the water flowing through the SWV and provide a reduced water flow over the dividing wall. To assist with flow rate control, instrumentation may be provided within the conduit to measure the velocity of the water, and this velocity information can be used to estimate flowrate through the conduit by way of a pre-determined flow profile.

When compared to a conventional sluice gate valve, a siphon weir valve is less expensive, particularly as the flow capacity of the valve increases, and reduces associated concrete construction costs. The SWV also simplifies maintenance since the parts that typically require servicing are above the water level. The SWV inherently prevents cross-contamination because it naturally provides an air gap over the dividing wall when the flow is off. Further, the flow entering the tank can be distributed across a large part of the membrane tank and made to have its momentum in the downward direction, which significantly reduces the force exerted by the incoming water on equipment in the tank. When compared to a simple siphon valve, a siphon weir valve can provide one or more advantages such as more efficient use of construction materials, suitability for very large flow rates (for example 1000 gpm or more), construction of multiple valve sizes using common components, and enhanced flow control.

FIGURES

DETAILED DESCRIPTION

Figure 1:
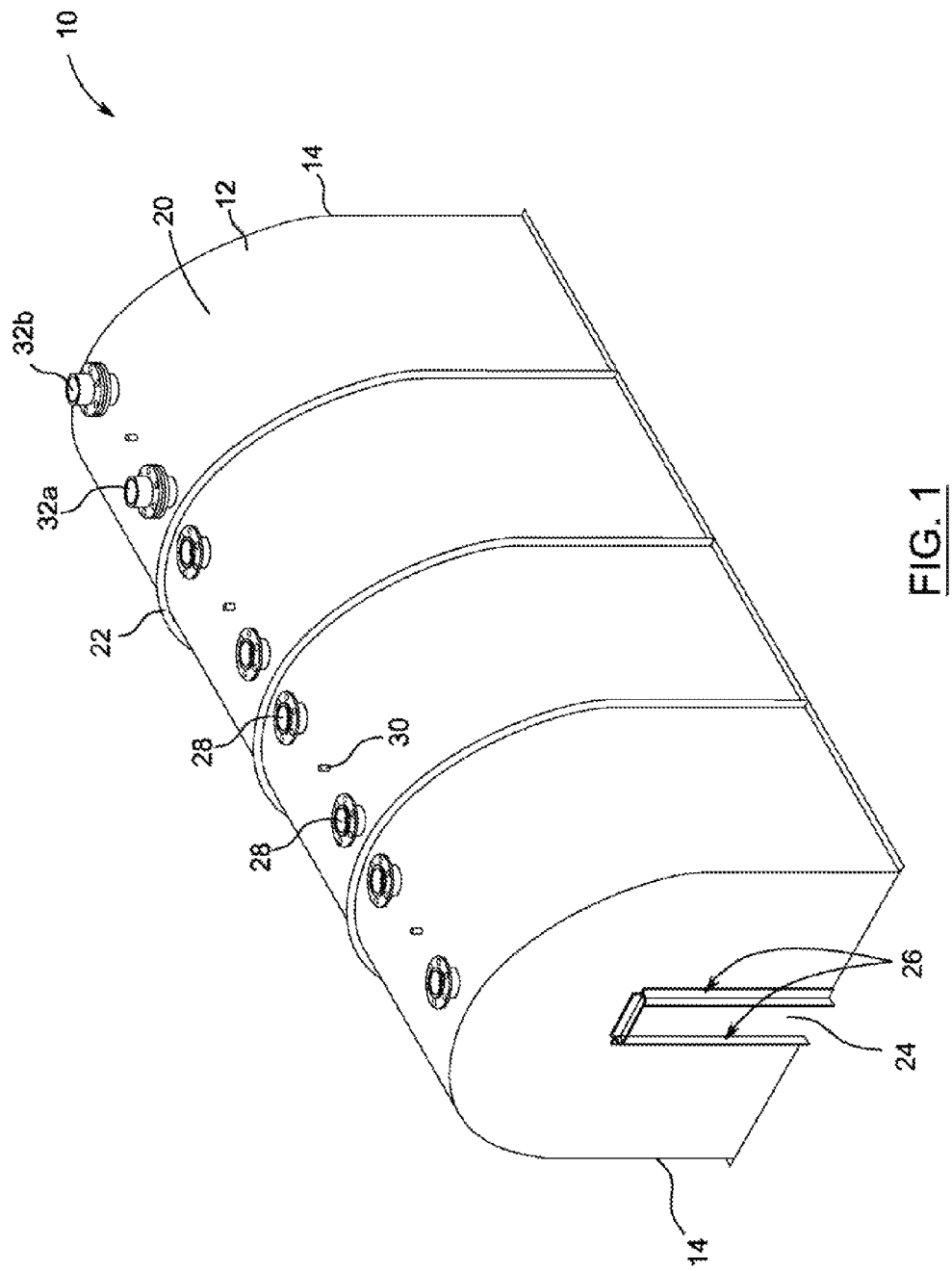
FIG. 1 is an isometric view of a siphon weir valve.
Figure 2:
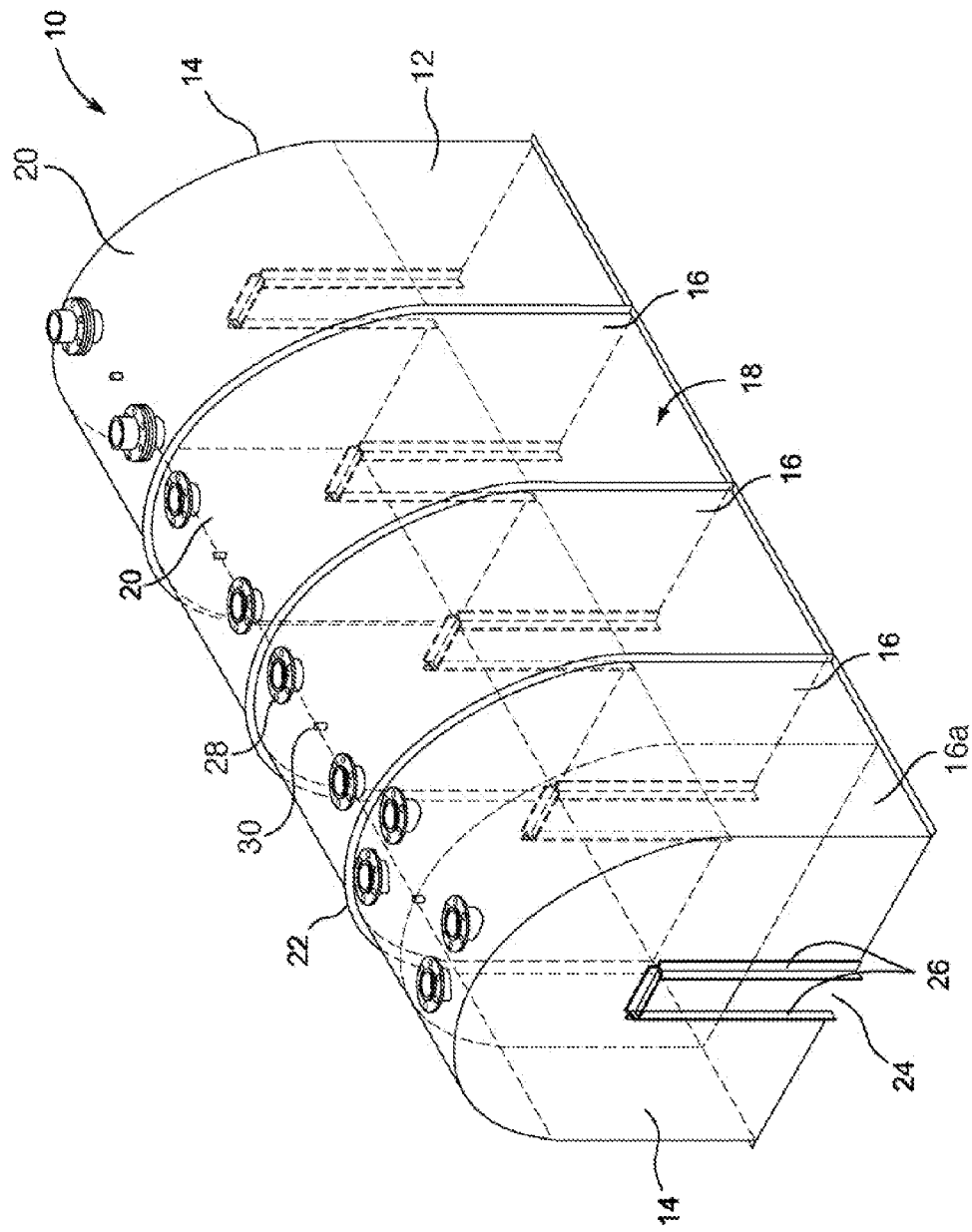
FIG. 2 is a simplified wire frame view of the siphon weir valve of FIG. 1.
Figure 3:
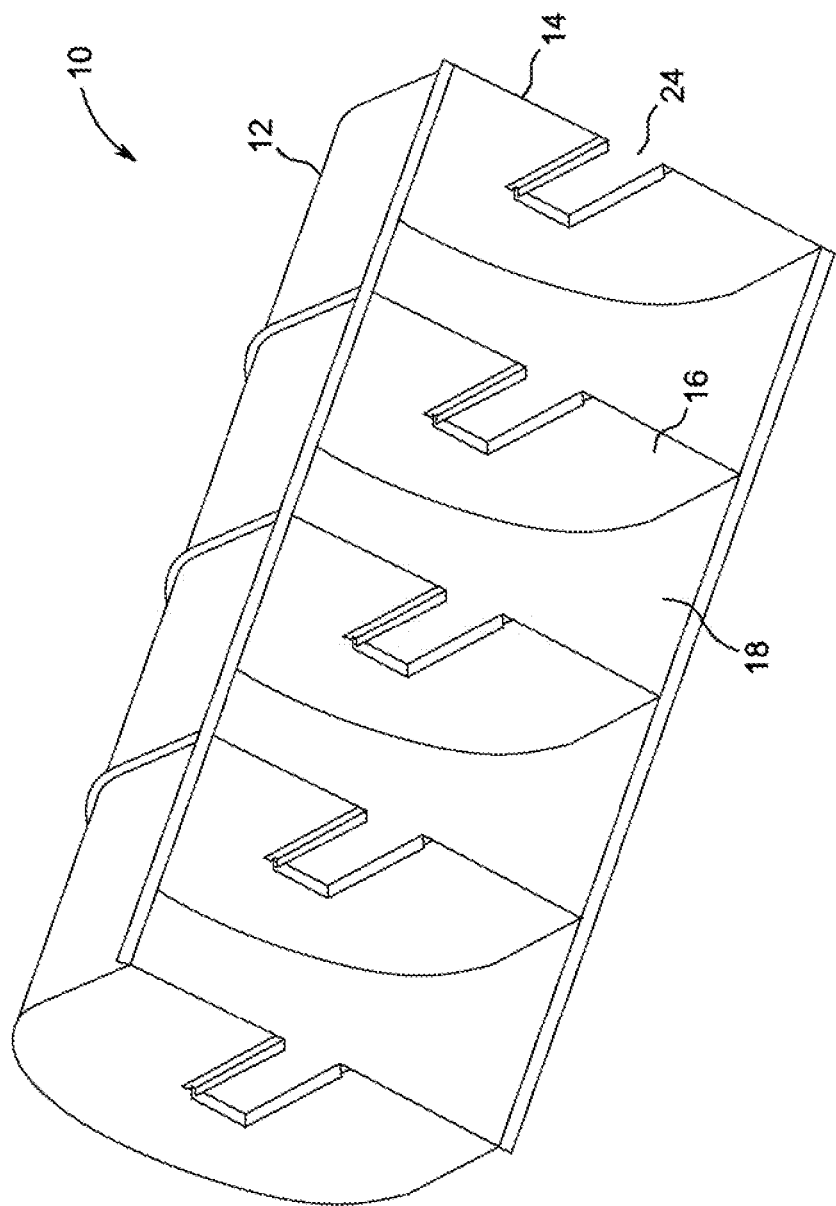
FIG. 3 is an isometric view of the siphon weir valve of FIG. 1 from below.

Referring to FIGS. 1, 2 and 3, an example of siphon weir valve 10 has a cover 12 attached to two end panels 14 to form an open-bottomed chamber. One or more interior panels 16 (three in the example shown) sub-divide the chamber into a plurality of cavities 18 (four in the example shown). The cover 12 is made in segments 20, one for each cavity 18 in the example shown. The segments 20 are bolted together through flanges 22. Longer or shorter siphon weir valves 10 can be made using more or less segments 20 and interior panels 16.

One or more segments 20 can also have differing lengths such that the cavities 18 are not all of the same length or volume. The panels 14, 16 can be attached to the segments 20 by welding or by bolting to the flanges 22. The panels 14, 16 and cover 12 can be fabricated from painted carbon steel, stainless steel of fiber reinforced plastic. Alternatively, the siphon weir valve can be made of concrete and formed either separately or integrally with the tank walls of a plant.

Each of the panels 14, 16 has a slot 24, optionally surrounded by brackets 26. The slots 24 are sized and configured so that the siphon weir valve 10 can be placed over the top edge of a wall separating two tanks in a plant. The siphon weir valve 10 may be bolted and sealed to the wall through the brackets 26. A gasket (not shown) may be placed between the brackets 26 and wall to aid in sealing the slot 24 to the wall. Surfaces of the part of the wall within and between the slots 24, in combination with the panels 14, 16 and cover 12, define a conduit through each cavity 18. Alternatively, an inverted "U" shaped insert (not shown) may be attached and sealed to the slots 24 to define the conduits within the cavities 18. In this case, the siphon weir valve may rest on the dividing wall without being sealed to the dividing wall. The seal to the dividing wall, and other connections between parts of the siphon weir valve 10, do not need to be perfectly impervious to air or water. However, the flow rate through any leaks should be small relative to intended flows of water and air so that any leaks do not prevent operation of the siphon weir valve 10.

Each cover segment 20 has one or more (two in the example shown) flanges 28 in communication with a cavity 18. As shown in the right side end segment 20 of FIG. 1, each flange 28 may be fitted with a valve 32. When the SWV 10 shown is installed, one of the flanges 28 of each cavity 18 is connected through a valve 32a to a source of suction, and the other flange 28 in each cavity is connected through another valve 32b to atmosphere. The source of suction may be, for example, a vacuum pump or ejector. The valves 32a for all of the cavities 18 may be connected to the same source of suction through a common pipe. The valves 32b for all of the cavities 18 may be connected to the same vent through a common pipe, or each may have its own vent, or the valves 32b may themselves function as vents. Other arrangements of pipes and valves, optionally using only one flange 28 per chamber 18, can also be used to allow the chamber 18 to be selectively exposed to a source of suction, closed (other than at its open bottom) or vented.

The shape of the panels 14, 16 can be varied provided that they will result in conduits that have an opening below the design water level on each side of a dividing wall between two tanks, the openings separated by a high point above these water levels. However, a curved, for example arcuate, semi-elliptical or semi-circular, shape in the top part of each conduit is useful because it is inherently strong in an area that must cause the water to change direction, provides a local high point for the flange 28, and minimizes energy losses through the conduit. The straight sections in the bottom part of each conduit may be generally vertical to not occupy additional tank footprint. The generally vertical section in the outlet also causes the water exiting a conduit to flow downwards rather than being directed horizontally at equipment in the downstream tank. The SWV 10 may also be made long enough to distribute flow across a large portion of the length of a wall, for example 50% or 75% of the length of a wall or more, to further reduce baffling requirements when the downstream tank includes sensitive equipment such as membrane cassettes.

Figure 4:
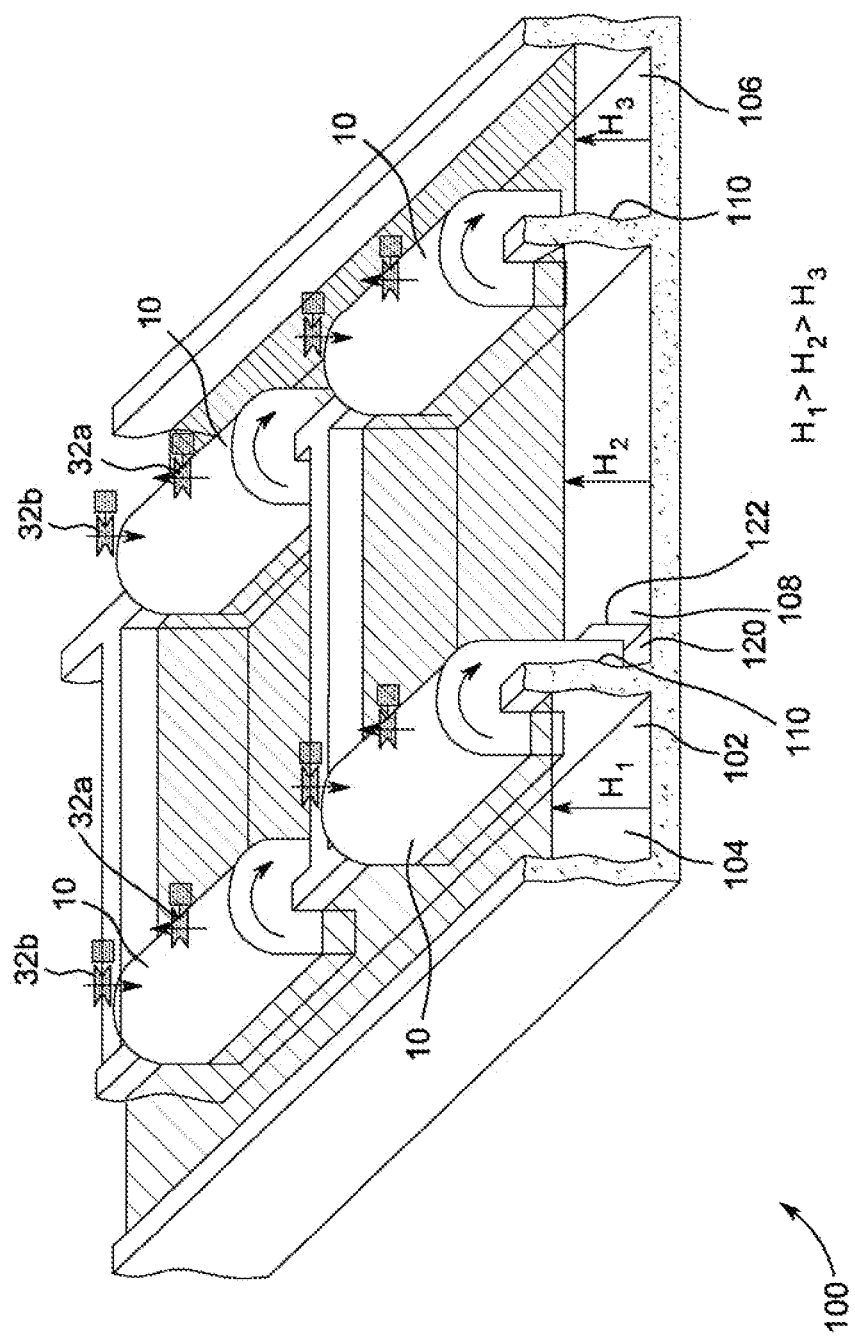
FIG. 4 is a pictorial representation of a portion of a membrane bioreactor fitted with four of the siphon weir valves of FIG. 1.

Referring to FIG. 4, an immersed membrane system 100 has a set of tanks 102 separated by dividing walls 110. The tanks 102 are formed of concrete and comprise a feed channel 104, a return channel 106 and one or more membrane tanks 108 in parallel between the feed channel 104 and return channel 106. Membrane cassettes (not shown) in the membrane tanks 108 are used to withdraw filtered permeate from the water as it passes through the membrane tanks 108. In use as an MBR, mixed liquor from one or more process tanks (not shown), for example an aerobic digestion tank, flows into the feed channel 104, through the membrane tanks 108, into the return channel 106 and back to the process tanks as return activated sludge in a recirculating flow. The recirculating flow is driven by one or more pumps that either lift the mixed liquor from the process tanks to the feed channel 104 or lift the mixed liquor from the return channel 106 to the process tanks, with the remaining flows in the system 100 being driven by differences in static head from upstream to downstream tanks 102. In particular, the elevation of the surface of the water in the feed channel 104 is higher than in the membrane tanks 108 which is higher than in the return channel 106. In use for drinking water production, feed water to be filtered is similarly sent into the feed channel 104 and flows to the membrane tanks 108, but unfiltered water (retentate) is typically discharged from the membrane tanks 108 without recirculation. Retentate might be set to a body of surface water that the feed was drawn from or to some form of disposal. In some cases, retentate may be discharged from the membrane tanks 108 into a channel 106, but is more likely to be discharged through a system of drain valves and pipes. In some MBRs, either of the feed channel 104 and return channel 106 may also be replaced with a system of pipes.

To operate the siphon weir valve 10, the tanks 102 on either side of a dividing wall 110 are first filled to a level at least as high as the bottom of the siphon weir valve 10. Initial filling of the tanks 102 can be by a separate system of fill pipes (not shown), by a valved connection between drain lines from the tanks 102 (not shown) or by temporarily overfilling an upstream tank 102 so that it overflows into a downstream tank 102. With the bottom of the siphon weir valve 10 extending down into the liquid on either side of a wall 110, flow can be initiated in one or more conduits of the siphon weir valve 10. To initiate flow in a conduit, the conduit is evacuated of air at least to an extent that water is drawn up over the height of the wall 110 and any part of the siphon weir valve 10 sitting on the top of the wall 110. Once the conduit is at least partially evacuated, flow occurs by siphon because the water level on the one side of the wall 110 is higher than on the other side 108.

In FIG. 4, siphon weir valves 10 are shown on inlet (upstream) and outlet (downstream) sides of the membrane tanks 108 to illustrate that the siphon weir valve may be used as either the inlet or outlet of a selected tank 102. However, in an MBR it is typically only necessary to have a flow control device on one side of a membrane tank 108, typically on the inlet side of the membrane tank 108. In that case, a simple weir on the downstream wall of a membrane tank 108 allows excess water to overflow into the return channel 106.

For drinking water applications, as mentioned above, the return channel 106 may be omitted and replaced with a drain. For some filtration processes, retentate water is bled from the membrane tank 108 continuously. However, in other filtration process the membrane tank 108 operates with periods of dead end flow (the rate of flow from the feed channel 104 is matched by the rate that permeate is removed from the membrane tank 108) separated by de-concentration or backwash processes during which the membrane tank 108 is drained.

Flow through a siphon weir valve 10 on the inlet side of the membrane tank 108 is stopped while the membrane tank 108 is drained. To allow the membrane tank 108 to be re-filled from the feed channel 104 using the siphon weir valve 10, a sump 120 is provided in the membrane tank 108 and the outlet of the siphon weir valve 10 is extended into the sump 120. The sump 120 may be in the form of a trough molded into the floor of the membrane tank 108, which may be a sump ordinarily provided for tank draining purposes. Alternately, the sump 120 may be provided by adding a sump wall 122, as shown in FIG. 4, across the width of the membrane tank 108 from the floor of the membrane tank 108 to a height above the outlet of the siphon weir valve 10. With either construction, the sump creates a U-shaped trap that contains a volume of water around the outlet of the siphon weir valve 10 even though the membrane tank 108 is otherwise drained. In the case of a sump also used for draining the membrane tank 108, draining is stopped before the sump itself is emptied. With a sufficient volume of water around the outlet of the siphon weir valve 10, a suction applied to the siphon weir valve 10 can raise the water level in the inlet (and outlet) of the siphon weir valve 10 enough to draw water from the feed channel 104 over the top of the wall 110 to start flow through the siphon weir valve 10. This allows the membrane tank 108 to be filled faster since the siphon weir valve 10 most likely has a greater flow rate than any other means in a plant for filling the membrane tank 108. The sump 120 may also be configured to diffuse energy in the water flowing into the membrane tank 108 to help protect the membrane cassettes.

Figure 5:
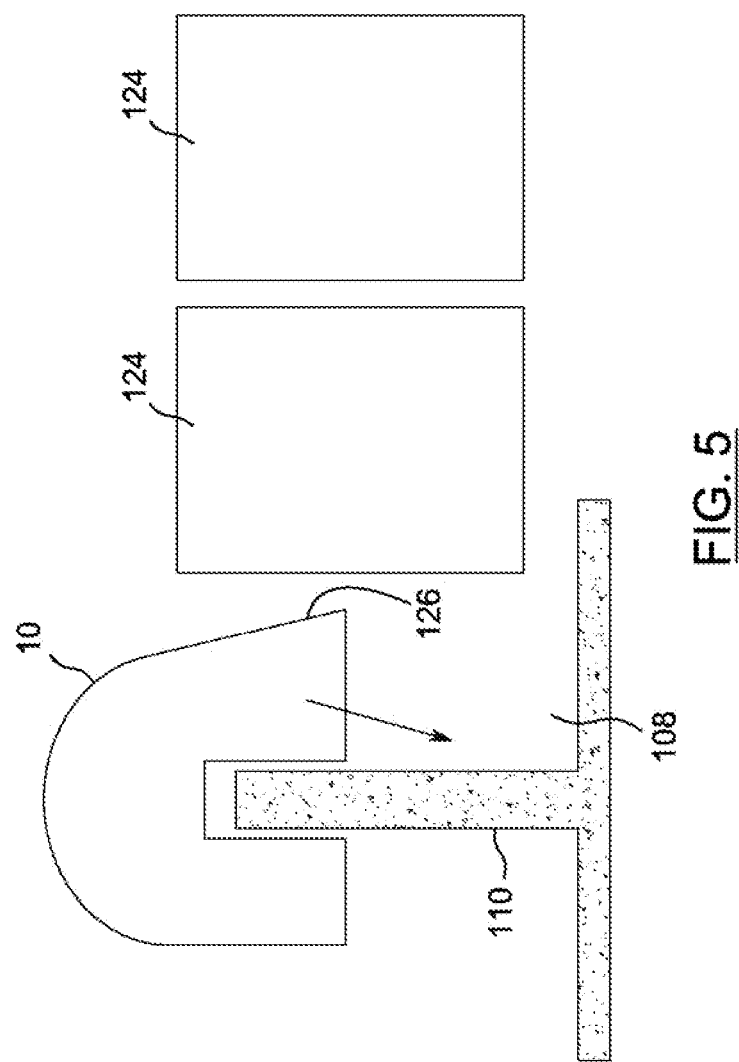
FIG. 5 is a side view of a siphon weir valve of FIG. 1 with an angled outlet.

FIG. 5 shows another siphon weir valve 10 having an angled outlet 126. The angled outlet 126 decreases the velocity of the water exiting the SWV 10. This helps reduce or remove the requirement for baffles to protect the membrane cassettes 124.

The need for baffles to protect the membrane cassettes can also be reduced by spreading the flow of water into the membrane tank 108 over a significant portion of the length of the separating wall 110. Using a long siphon weir valve 10 also reduces the distance that the siphon weir valve 10 must project into the membrane tank 108 for a given flow rate, thus conserving tank 102 footprint. FIGS. 6 to 10 illustrate a second siphon weir valve 200 that extends across the entire width of a narrower one of two tanks 102 being served by the second siphon weir valve 200. The second siphon weir valve 200 thus helps reduce or remove the need for baffling, for the reasons described above, and also uses the ordinary walls of a tank for up to three sides of its inlet or outlet. Further, the length of the second siphon weir valve 200 reduces the diameter required for the portion of the second siphon weir valve 200 located over a wall 110. Although not shown in FIGS. 6 to 10, the second weir valve 200 may also be sub-divided with internal baffles to provide multiple distinct chambers, as in the siphon weir valve 10.

Figure 6:
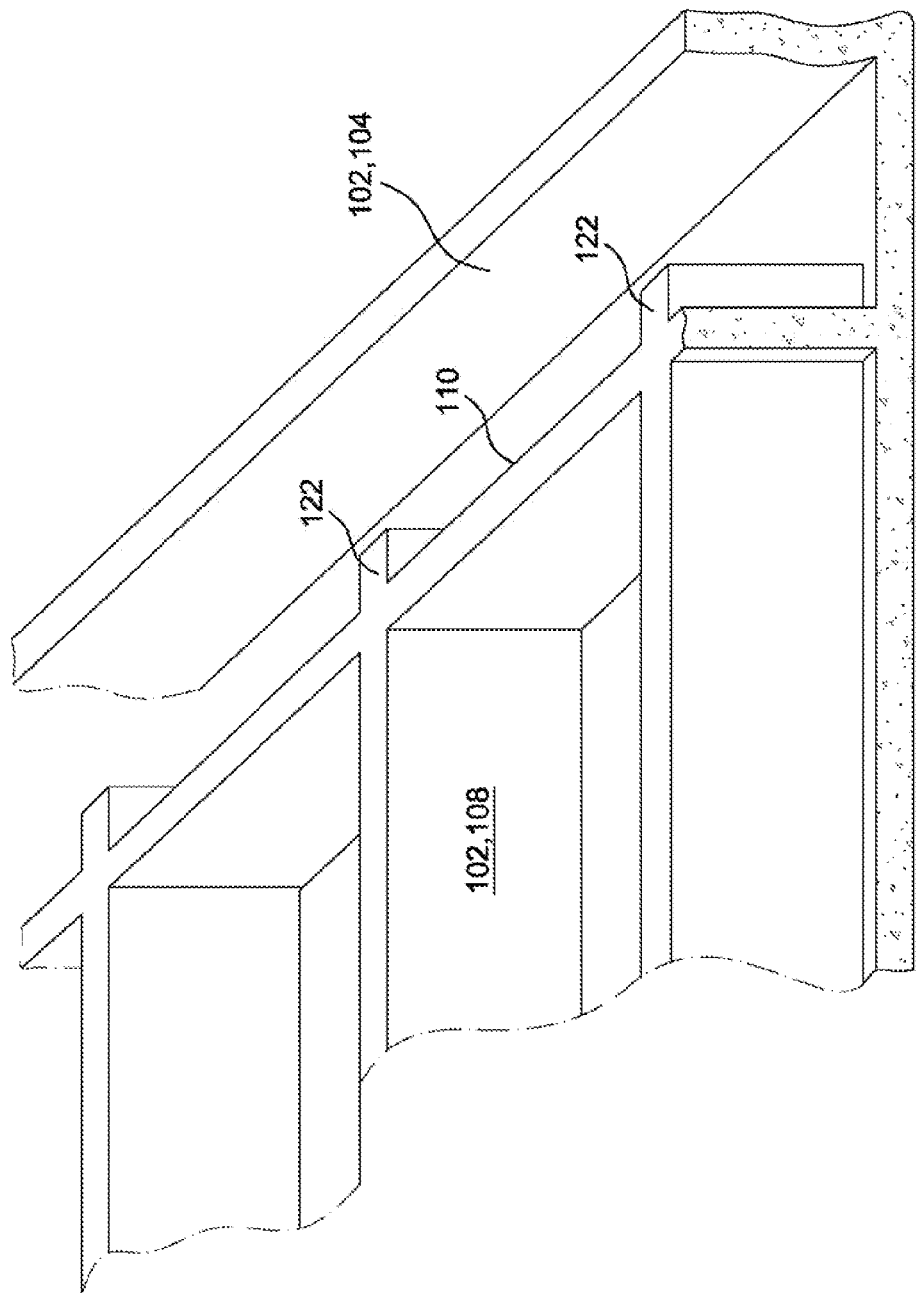
FIGS. 6 to 9 shows steps in the construction of a second siphon weir valve extending across the full width of a tank.
Figure 7:
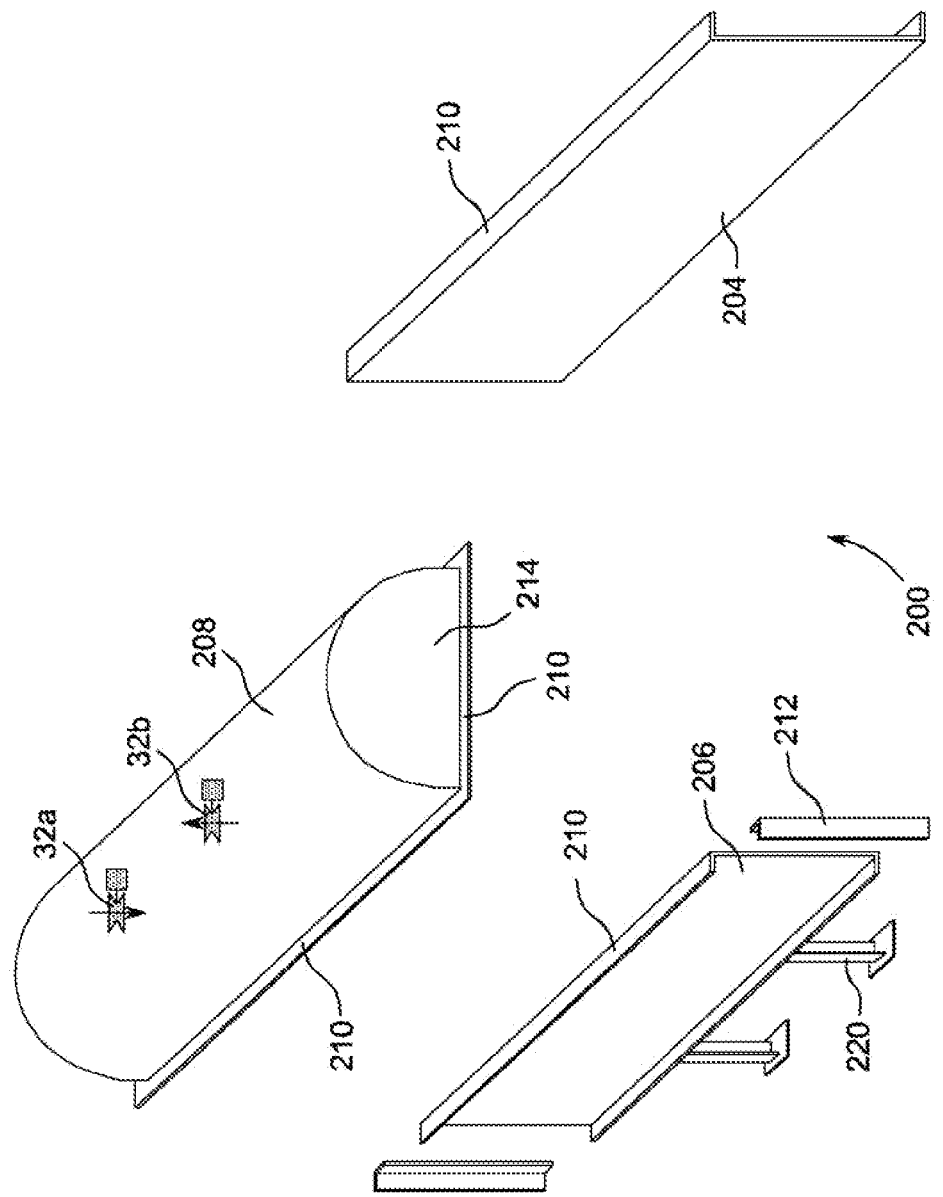

Referring to FIG. 6, one of the tanks 102 may extend beyond a dividing wall 110 that will be fitted with a second siphon weir valve 200. In this case, short extensions 122 may be added to the dividing wall 110 extending into the larger tank 102. Referring to FIG. 7, the second siphon weir valve 200 comprises an inlet baffle 204, and outlet baffle 206 and a top chamber 208. The inlet baffle 204 and outlet baffle 206 are basically flat plates, each with an upper flange 210 or other means for attachment to the top chamber 208. The baffles 204, 206 may also have other features for stiffening or to facilitate attachment to a tank 102. For example, the outlet baffle 206 in the illustrated example has brackets 212 for bolting the outlet baffle 206 to a tank 102. The top chamber 208 may be made of metal plates, or from one or more sections of a commercially available pipe cut in half lengthwise, attached to end plates 214. Flanges 110 are provided for attaching the top chamber 108 to the baffles 106 and parts of the top of the tanks 102.

Figure 8:
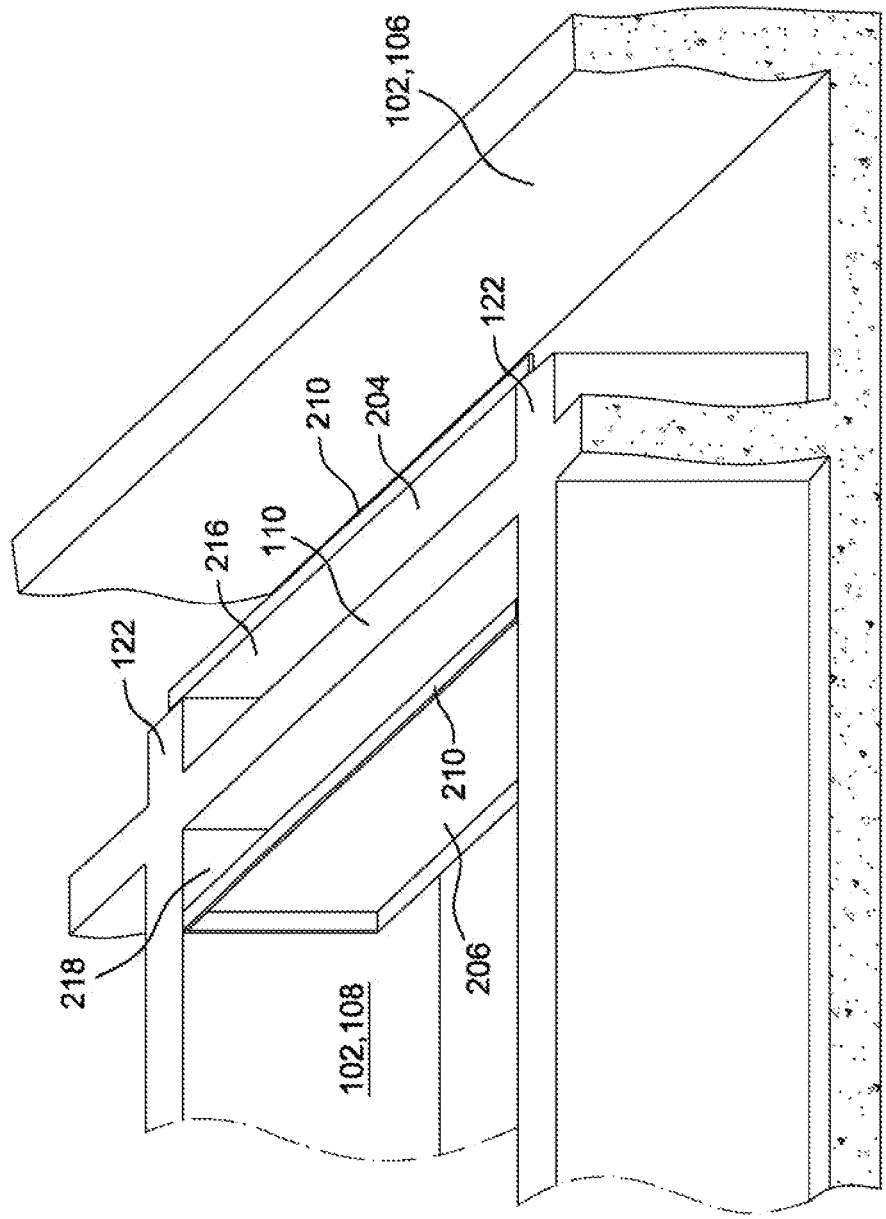
Figure 9:
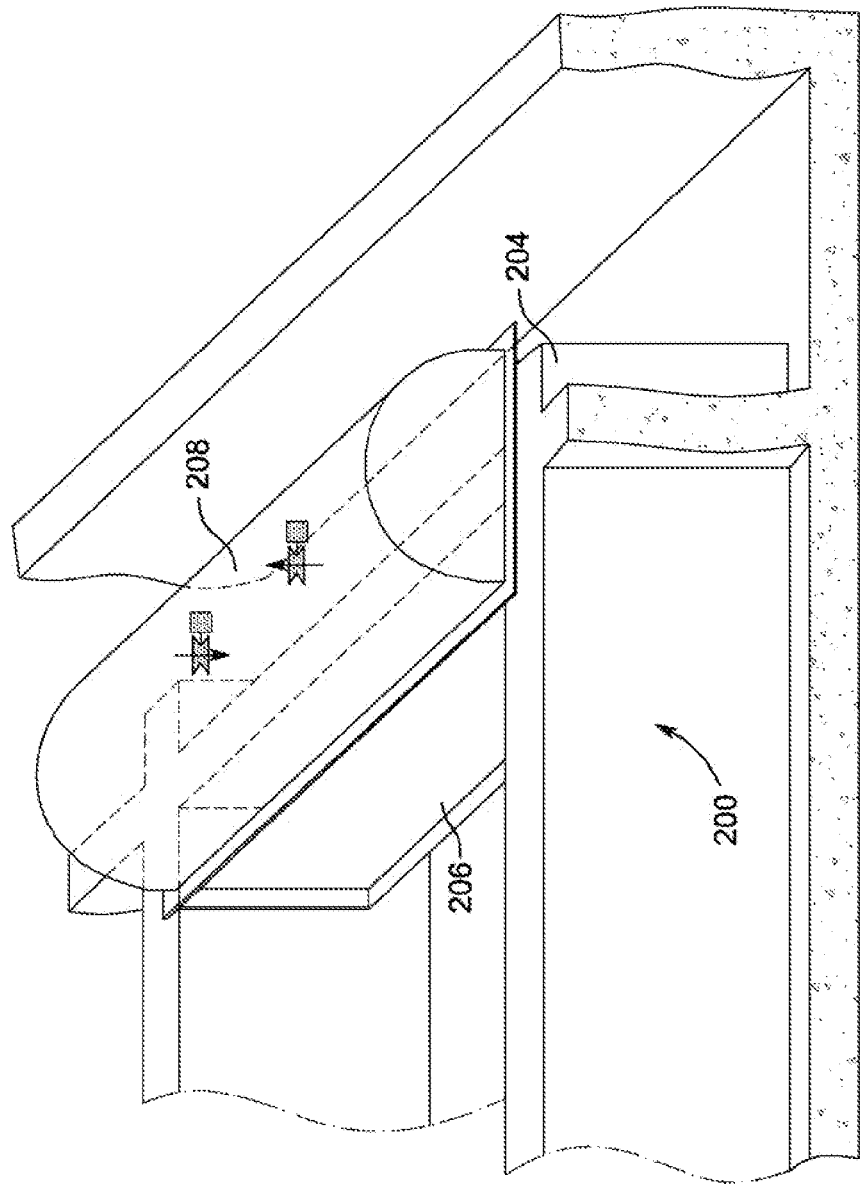
Figure 10:
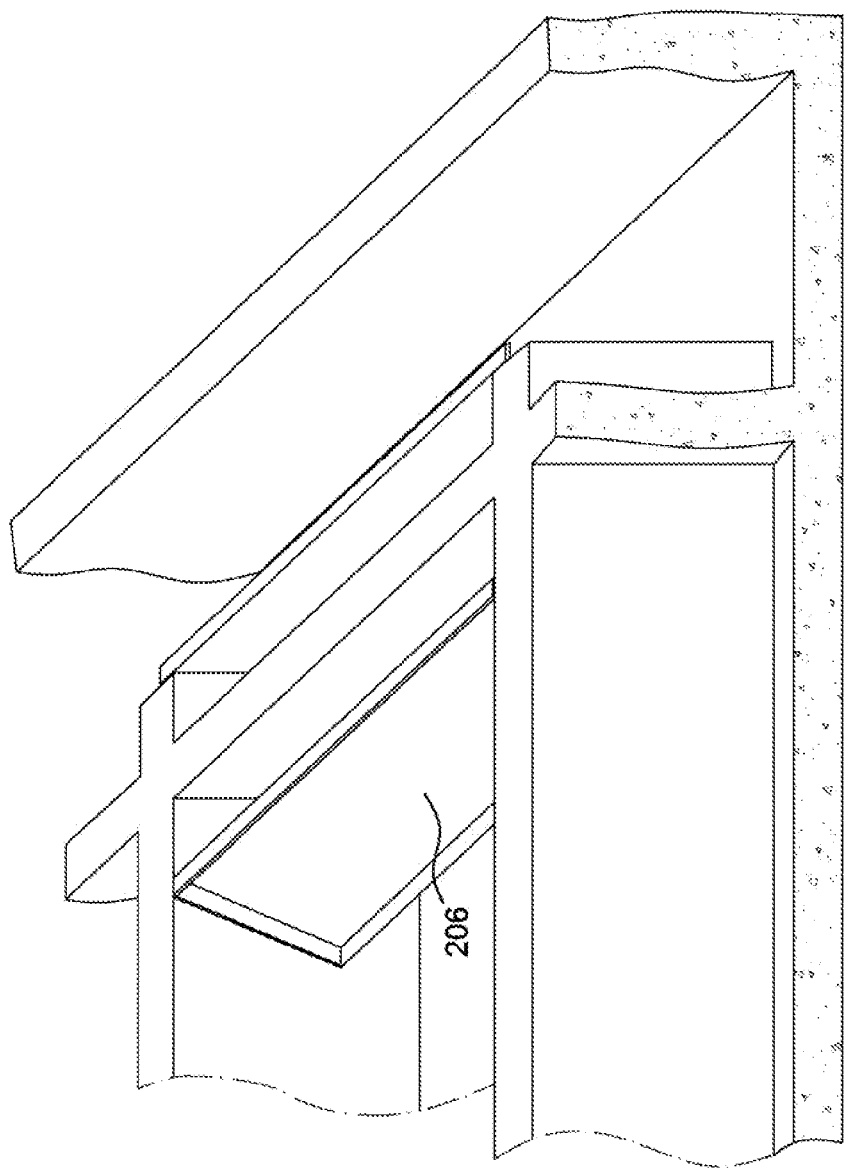
FIG. 10 shows a variation of the second siphon weir valve of FIGS. 6 to 9 having an outlet with increased area.

Referring to FIG. 8, an inlet 216 and an outlet 218 are formed by bolting the inlet baffle 204 and the outlet baffle 206 to the tanks 102 on either side of the dividing wall. In the example shown, the inlet baffle 204 is bolted to the tank extensions 122 leaving a space between the bottom of the inlet baffle 204 and the floor of the upstream tank 102. Alternately, the inlet baffle 204 may be provided with sides that serve the function of the extensions 122. The outlet baffle 206 is bolted to brackets 212, which are bolted to the sidewalls of the downstream tank 102. Support struts 220, shown in FIG. 7, may be added to help support the weight of the baffles 104, 106. The outlet baffle 206 may extend downwards into a sump as described further above. Alternately, the bottom of the outlet baffle 206 may be located above the floor of the downstream tank 102 by a distance, for example twice the distance from the outlet baffle 206 to the dividing wall 110, to reduce the velocity of the water entering the downstream tank 102. Referring to FIG. 10, the exit velocity of the water may also be reduced by angling the outlet baffle 206 outwards towards the bottom of the outlet baffle 206 such that the cross-sectional area of the outlet is increased. Referring to FIG. 9, the top chamber 208 is placed over the baffles 204, 206 and sealed to the baffles 204, 206 and the parts of the tanks 102 extending between the baffles 204, 206. A conduit is thus formed from the inlet 116 to the outlet 118 over the dividing wall 110 through the top chamber 208. The direction of flow may also be reversed, with the inlet 116 becoming the outlet 118, with the specific configuration of the baffles 204, 206 changed as required for different tanks 102.

In the SWV 10 shown in FIGS. 1 to 3, flow is started by closing the valve 32b associated with a conduit and opening the associated valve 32a until sufficient water enters the conduit. Valve 32a is closed after a desired flow or the maximum flow is initiated. Flow can be initiated in multiple conduits at the same time. Alternatively, the valves 32a can be controlled such that only one conduit, or a small number of them, can be subjected to suction at any one time. In this way, the suction system only needs to be sized for one or a small number of conduits rather than for all conduits in the system 100. An air release or priming valve can be used to prevent liquid from being drawn from the siphon weir valve 10 into the vacuum system. The air release or priming valve has a float connected to valve to close the path between the siphon weir valve 10 and the suction system if liquid enters that path.

To stop the flow in a conduit, sufficient air is allowed to enter the conduit to break the siphon. In the SWV 10 shown, valve 32a is opened, the conduit fills with air and the water in the conduit falls into the tanks 102 on either side to the level of the surrounding water in those tanks 102. The siphon weir valve 10 thus provides "on/off" flow control for water flowing from one tank 102 to an adjacent tank 102. After the siphon weir valve 10 has been vented, the dividing wall 110 prevents flow between the tanks 102. If servicing is required, the siphon weir valve 10 can be wholly or partially dismantled or removed as required without requiring any backup method or secondary isolation method for preventing flow between the tanks 102. When vented, the siphon weir valve 10 inherently provides an "air gap" between the two tanks and ensures that diffusion or cross contamination cannot occur between the tanks 102.

The siphon weir valve 10 can be operated to control the rate of liquid flow through it. Selecting the number and size of conduits to evacuate of air roughly controls the flow. In the example of a siphon weir valve 10 illustrated in FIG. 1, each conduit provides one quarter of the total flow, and so the flow can be controlled in increments of one quarter by selecting the number of conduits in operation. Optionally, the conduits can be made to have unequal sizes. For example, FIG. 2 shows how one of the chambers 18 could be sub-divided by an additional interior panel 16a located to provide two smaller chambers 18 having widths of one third and two thirds of the width of one of the other three chambers 18. Valves 32a and 32b would be provided for each of the smaller chambers 18. The smaller chambers 18 would have volumes of one twelfth and two-twelfths of the siphon weir valve 10 respectively. By selecting a number of regular chambers 18, and one or both of the smaller chambers 18 to put in operation, any flow that is a whole number of twelfths of the total flow could be provided.

The flowrate of water through the siphon weir valve 10 can also, or additionally, be varied by providing some air in the top of one or more chambers 18. The amount of air provided is insufficient to break the siphon, but sufficient to displace some of the water in the siphon weir valve 10. An initial amount of air can be provided by leaving a pocket or air in the top of the siphon weir valve 10 when starting flow, or by opening a valve 32b to allow some air to be drawn into the top of a siphon weir valve 10 with water flowing through it. As the siphon weir valve 10 operates at a reduced flow rate, air in the top of the siphon weir valve is likely to be entrained in the flowing water, particularly if the reduced flow rate is near the full flow rate, and the flow rate will tend to increase over time. To maintain the desired flow rate, valve 32b can be opened partially or from time to time to admit more air as required to make up for lost entrained air. Information from instrumentation to measure the height of water in the siphon weir valve 10, or the velocity or rate of flow through the siphon weir valve 10, for example as described further below, can be used to create a feedback loop to control the opening of a valve 32b to maintain a desired flow rate.

Optionally, each cover segment 20 has one or more half-couplings 30 or other ports in communication with its associated chamber 18. The half-coupling 30 is used to install instrumentation into the chamber 18. For example, a liquid level sensor or a vacuum pressure transmitter may be placed in communication with the inside of a chamber 18. A vacuum pressure transmitter is preferably mounted flush with the inside of the cover 12 and can be used to indicate when the conduit is under suction and when there is liquid flow through the conduit if the conduit is full of liquid.

Optionally, instrumentation can be provided within the chamber 18 to measure the velocity of the water flowing through it. For example, a rotating vane or differential pressure liquid velocity sensor can be located in the inlet or outlet leg of each chamber 18. A flow profile can be produced relating the sensed velocity to the flow rate through a conduit. A profile can be also be produced correlating the flow rate to the difference in water elevation between the upstream and downstream tanks.

The exemplary siphon weir valve 10 shown in FIGS. 1 to 3 is drawn to scale. It is 16 feet long and 84 inches wide. This specific siphon weir valve 10 was designed for a flow of 20,000 gallons per minute with a velocity of 1 foot per second, but is expected to be useful when scaled for other high flow applications, for example with a design flow of 3,000 gpm or more. It was designed to be fitted over a concrete wall separating two tanks in an MBR and replaces a large submerged knife gate or sluice gate valve that would typically used for this application. The cost of the siphon weir valve is estimated to be less than one quarter of the cost of a knife gate valve of similar capacity. Further, since the siphon weir valve 10 mounts on the dividing wall, and no opening in the concrete between the two tanks is required, the amount of reinforcement that is required in the wall is reduced compared to a submerged valve. In a very large municipal wastewater treatment plant with a capacity of 50 mgd or more, the savings in the cost of valves and associated concrete work is expected to be over a million US dollars.

The specific siphon weir valve 10 described herein is provided as an example and not to limit or define the slope of any claimed invention. The invention protected by this document is defined by the following claims.

We claim:

1. A device for providing a flow of water over a wall comprising,
    a pair of spaced, generally planar end walls, each having a notch sized and configured to receive an upper portion of the wall;
    one or more interior walls, each having a notch sized and configured to receive an upper portion of the wall, the one or more interior walls located between the end walls; and,
    a cover attached to an upper portion of the outer edges of the end walls and the one or more interior walls, wherein,
    the end walls, the one or more interior walls, and the cover form a plurality of open-bottomed chambers with at least an upper part of the notches of the end walls and the one or more interior walls located above the bottom of the chambers; and,
    each of the chambers has at least one opening in communication with an upper part of the chamber located above the top of the notches of the end walls and the one or more interior walls, the at least one opening of each chamber being selectively connectable in communication with a source of suction and a vent.

2. The device of claim 1 wherein a first chamber has a volume that is less than the volume of a second chamber.

3. The device of claim 2 wherein the first chamber has a volume of two thirds or less of the volume of the second chamber.

4. The device of claim 1 having a vacuum pressure sensor in communication with an upper part of each of the chambers.

5. The device of claim 1 having a flow velocity sensor in communication with each of the chambers.

6. The device of claim 1 wherein the cover comprises a plurality of cover segments.

7. A device for providing a flow of water over a wall comprising,
    a pair of spaced, generally planar end walls, each having a notch sized and configured to receive an upper portion of the wall; and,
    a cover attached to an upper portion of the outer edges of the end walls,
    wherein,
    the end walls and the cover form an open-bottomed chamber with at least an upper part of the notches of the end walls located above the bottom of the chamber;
    the upper portion of the walls has a curved shape such that a central part of the chamber is located above the sides of the chamber;
    the chamber has at least one opening in communication with the central part of the chamber, the at least one opening being selectively connectable in communication with a source of suction and a vent; and,
    the device has a flow velocity sensor in communication with the chamber.

8. The device of claim 7 wherein at least the upper part of the notches are sealed to the wall such that the wall and the device define a conduit from one side of the wall to the other side of the wall.

9. The device of claim 7 having a vacuum pressure sensor in communication with the chamber.

10. A process for providing and controlling a liquid flow between two open tanks separated by a dividing wall comprising the steps of,
    a) providing a plurality of conduits over the wall from one tank to the other tank;
    b) selecting one or more of the conduits having a combined maximum flow rate capacity at least as large as a desired flow rate between the tanks; and,
    b) applying a suction to the selected conduit(s) to provide a siphon flow through the selected conduit(s).

11. The process of claim 10 wherein sufficient air is provided in one or more of the selected conduit(s) to reduce the flow rate through the device from the combined maximum flow rate capacity of the selected conduit(s) to about the desired flow rate.

12. The process of claim 10 further comprising steps of receiving a signal related to a flow velocity within one of the conduits and applying the received signal to a flow profile to determine a flow rate through the conduit.

13. A device for providing a flow of water over a wall comprising,
    a conduit having an inlet one side of the wall, an outlet on the other side of the wall, and a central part above and between the inlet and the outlet; and,
    at least one opening in communication with the central part of the chamber, the at least one opening being selectively connectable in communication with a source of suction and a vent,
    wherein the outlet is located within a sump.

14. A device for providing a flow of water over a wall comprising, a conduit having an inlet on one side of the wall, an outlet on the other side of the wall, and a central part above and between the inlet and the outlet; and,
    at least one opening in communication with the central part of the chamber, the at least one opening being selectively connectable in communication with a source of suction and a vent,
    wherein the outlet has a larger cross sectional area than the inlet, or the outlet is configured to discharge water downwards and towards the wall.

15. A device for providing a flow of water over a wall to or from a tank comprising,
    a conduit having an inlet one side of the wall, an outlet on the other side of the wall, and a chamber above and between the inlet and the outlet; and,
    at least one opening in communication with the central part of the chamber, the at least one opening being selectively connectable in communication with a source of suction and a vent,
    wherein,
    a portion of at least one of the inlet and the outlet is defined by a part of the wall.

* * * * *